United States Patent [19]
Babel

[11] Patent Number: 4,718,175
[45] Date of Patent: Jan. 12, 1988

[54] DEVICE FOR MECHANICAL CHECKING FOR TOOLBREAKAGE IN MACHINE TOOLS

[75] Inventor: Werner Babel, Pfronten-Meilingen, Fed. Rep. of Germany

[73] Assignee: MAHO Aktiengesellschaft, Fed. Rep. of Germany

[21] Appl. No.: 880,074

[22] Filed: Jun. 30, 1986

[30] Foreign Application Priority Data

Jul. 1, 1985 [DE] Fed. Rep. of Germany ....... 3523510

[51] Int. Cl.$^4$ ................... B23B 47/24; G01B 5/02
[52] U.S. Cl. ................................ 33/626; 33/561; 33/201; 408/6
[58] Field of Search .......... 33/172 E, 185 R, 561, 33/558, 626, 201; 408/6, 16

[56] References Cited

U.S. PATENT DOCUMENTS

| | | | |
|---|---|---|---|
| 2,920,508 | 1/1960 | Wennerberg | 408/6 |
| 2,953,044 | 9/1960 | Kimble et al. | 408/6 |
| 3,669,557 | 6/1972 | Mitchell | 408/16 |
| 3,870,430 | 3/1975 | Guenot | 408/6 |
| 4,031,628 | 6/1977 | Kaesemeyer | 33/201 |

FOREIGN PATENT DOCUMENTS 0127751 12/1984 European Pat. Off.
45898 11/1966 Fed. Rep. of Germany.

*Primary Examiner*—William D. Martin, Jr.
*Attorney, Agent, or Firm*—Lahive & Cockfield

[57] ABSTRACT

The invention relates to a device for checking for tool breakage in machine tools having a sensor for sensing a clamped tool before and after a machining operation and an electronic device for evaluation of the measurement detected by the sensor. According to the invention the sensor is constructed as a moveable feeler rod (5) and in each measuring operation is pressed against the tool tip with an adjustable force independent of the length of the tool (7) concerned. A device for determining the respective measuring position of the feeler rod (5) provides the data for the evaluation.

10 Claims, 5 Drawing Figures

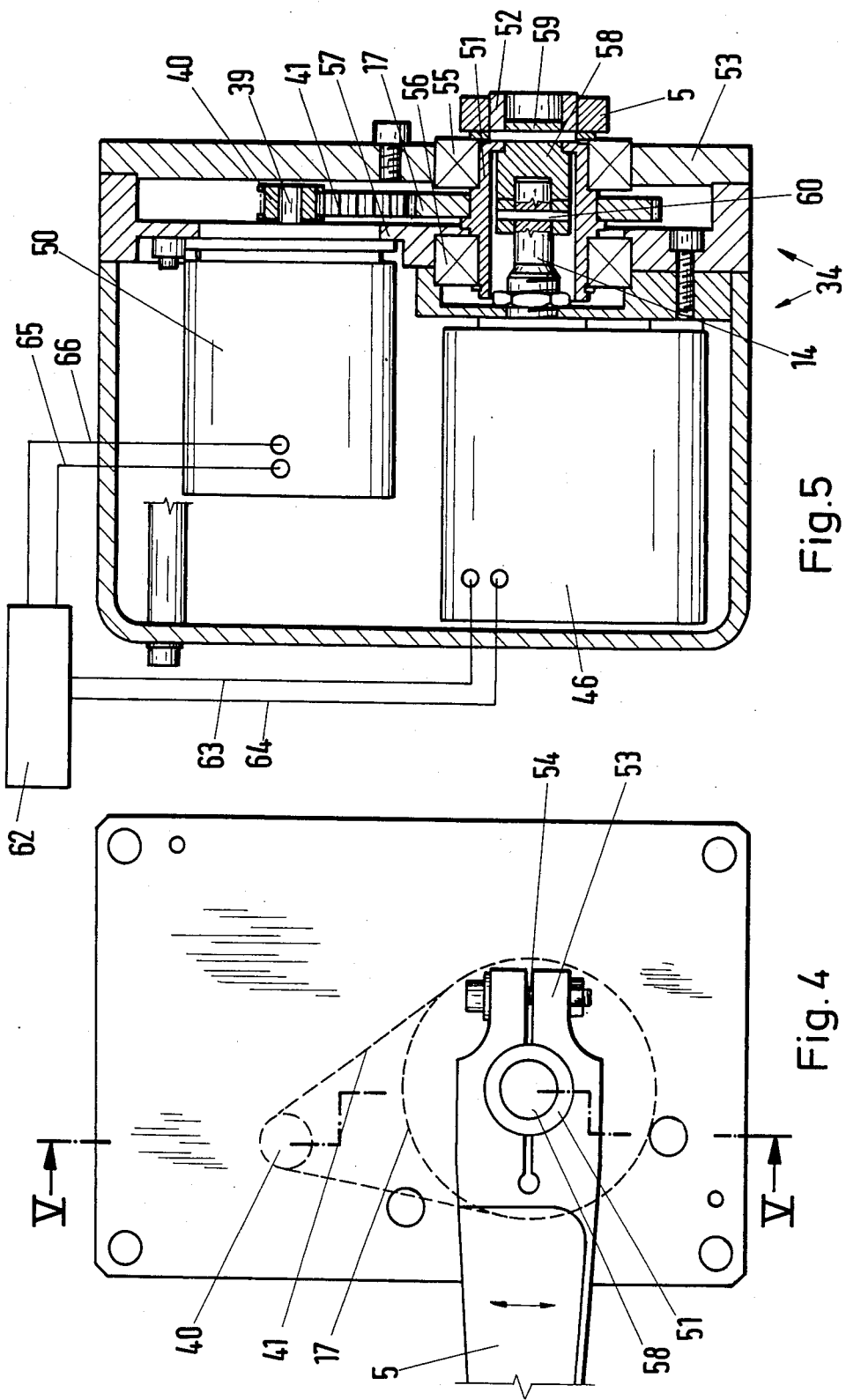

DEVICE FOR MECHANICAL CHECKING FOR TOOLBREAKAGE IN MACHINE TOOLS

TECHNICAL FIELD OF THE INVENTION

The invention relates to a device for checking for tool breakage in machine tools having a sensor that senses the tip of a clamped tool before and after a machining operation and an electronic device for evaluating the measurements made by the sensor.

BACKGROUND OF THE INVENTION AND THE PRIOR ART

In modern machine tools for milling and drilling work, in which a plurality of machining operations are performed automatically according to a programme stored in the electronic controller, using different tools, a series of monitoring and checking functions are of course necessary in order to recognise possible sources of error in good time and to indicate and if possible also eliminate them. An important role is played in practice by the detection of tool breakages, and in particular of drill breakages. Thus if a broken drill tip remains in the drilled hole and this hole is further machined, e.g. widened out with a further tool in a subsequent machining operation, this subsequent tool encounters the tool tip left in the hole with the result that this subsequent machining operation cannot be performed and also that the further tool may break. Furthermore, since several machining operations are often performed with one and the same tool on the same or succeeding work-pieces in an automatic machining sequence, it is necessary to ensure that each of these tools remains in an operative condition.

Because of the facts set forth above various systems for checking for breakage of drills and other tools have been developed, in particular for universal drilling and milling machines, by which each of the various tools can be measured before and after each machining operation. The various measurements are electronically compared either in the numerical control device of the machine tool or in a special device, and, if there are substantial deviations, marking of the tool concerned takes place in the control, possibly coupled with an optical or acoustical sign, by which, for example, the further use of that tool is prevented.

As a rule electro-optical systems are used for monitoring tool breakages, with their light sources and photo-cells arranged in the immediate working area of the machine tool so that the particular tool is illuminated over a predetermined length and the light intensity detected by the photo-cell is evaluated as an index of the condition of the tool concerned. In practice however serious disadvantages have been found with systems operating on electro-optical principles. Thus since the tools used can have very varied lengths and diameters, correspondingly large spatial ranges of measurement must be monitored with the same degree of accuracy. Furthermore the turnings and drilling fluid often lead to troubles in the checking system, since the turnings and/or liquid droplets that may for example cling to the cutting edges of the drill can lead to false readings of the measurements. Particular difficulties occur in the case of very long, thin drilling tools.

OBJECT OF THE INVENTION

The object of the invention is to provide a device for checking and monitoring for tool breakages, particularly drill breakages, that is not sensitive to effects of the machine tool operation and guarantees reliable detection and evaluation of damaged tools over a wide range of measurement with constant accuracy.

SUMMARY OF THE INVENTION

This problem is solved, according to the invention, by using as sensor a moveable feeler rod that is always urged against the tool tip with the same force in each measuring operation independently of the length of the tool concerned, and by providing a device for determining the respective measuring position of the feeler rod which provides the data for the evaluation device.

According to the invention, the detection of the respective tool length before and after each machining operation is effected by mechanical means, so that the accuracy of measurement is the same over the whole relatively large range of measurement. This is achieved by the pressure with which its free end is pressed against the tip of the tool concerned being the same in every position of the test rod. This constant pressure guarantees a direct application of the feeler rod directly to the possibly possible broken-end of the tool, unaffected by particles or droplets of drilling fluid adhering to the tool tip. Thus even tools with very different lengths and diameters can be checked for breakage with the same accuracy and without influence by external factors. Monitoring of the inevitable wear of the tool cutting edges is possible with this device, and also measurement of length for the purpose of adjusting the zero-point of the numerical controller.

The device according to the invention is preferably used with universal milling and drilling machines having tool magazines and a high degree of automation. It is particularly advantageous to arrange the device in the neighbourhood of the transfer station between the tool magazine and the machine, so that immediately before and after each transfer operation by the tool changer the length of the tool clamped in its taper is detected. In the control device of the machine tool the measurement data for the tool concerned before and after the machining operation are compared with one another so that a signal about a possible tool breakage can be derived therefrom.

According to a particularly preferred embodiment of the invention the feeler rod is pivotably mounted transverse to the tool axis and is coupled to a drive which moves the feeler rod up to the tool tip and then exerts the predetermined contact pressure. This embodiment makes possible a constructionally simple and space-saving embodiment of the drive and the means of transmission to the feeler rod, and the arrangement of this device in the tool transfer region without interfering with the movements of the tool magazine and/or the tool-changer. In this embodiment the feeler rod can be fixed radially to a rotating body that is coupled via carriers to a disc mounted on the same axis and driven by the driving motor via a belt drive.

Another embodiment of the invention of simple construction and high accuracy is characterised by the feeler rod being connected to the shaft of the electric driving motor by a flexible coupling and to a shaft encoder by a transmission.

According to another embodiment of the invention the feeler finger, aligned transverse to the tool axis, can be displaced parallel to the tool axis by means of a linear drive such as a gas pressure spring, a pneumatic or hydraulic operating cylinder, an electromagnet or the like.

BRIEF DESCRIPTION OF THE DRAWINGS

Further important features and advantages of the invention appear from the follwoing description of exemplary embodiments with reference to the drawing, in which:

FIG. 4 is a diagrammatic side view of another exemplary embodiment;

FIG. 5 is a vertical section on V—V of the device according to FIG. 4.

DETAILED DESCRIPTION OF A PREFERRED EMBODIMENT OF THE INVENTION

Figure 1:
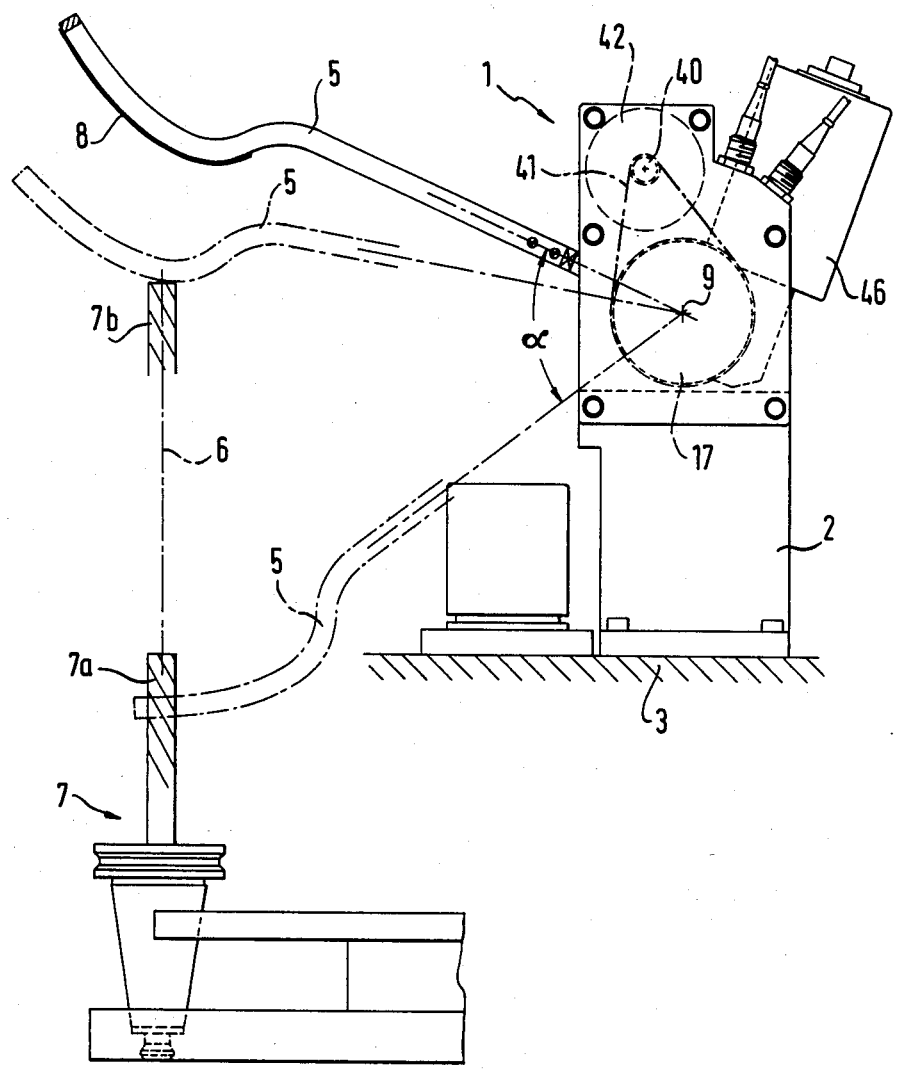
FIG. 1 is a diagrammatic side view of the apparatus.
Figure 2:
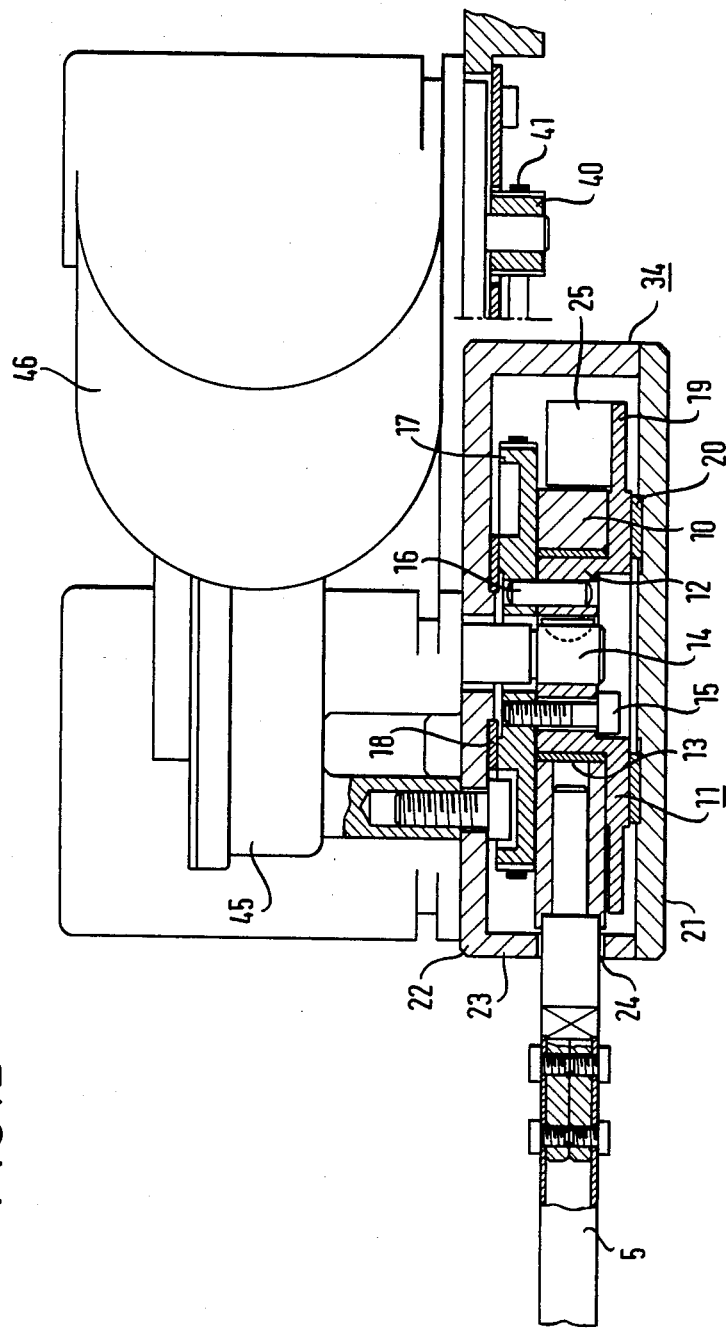
FIG. 2 is a partly sectioned plan view of the apparatus according to FIG. 1.
Figure 3:
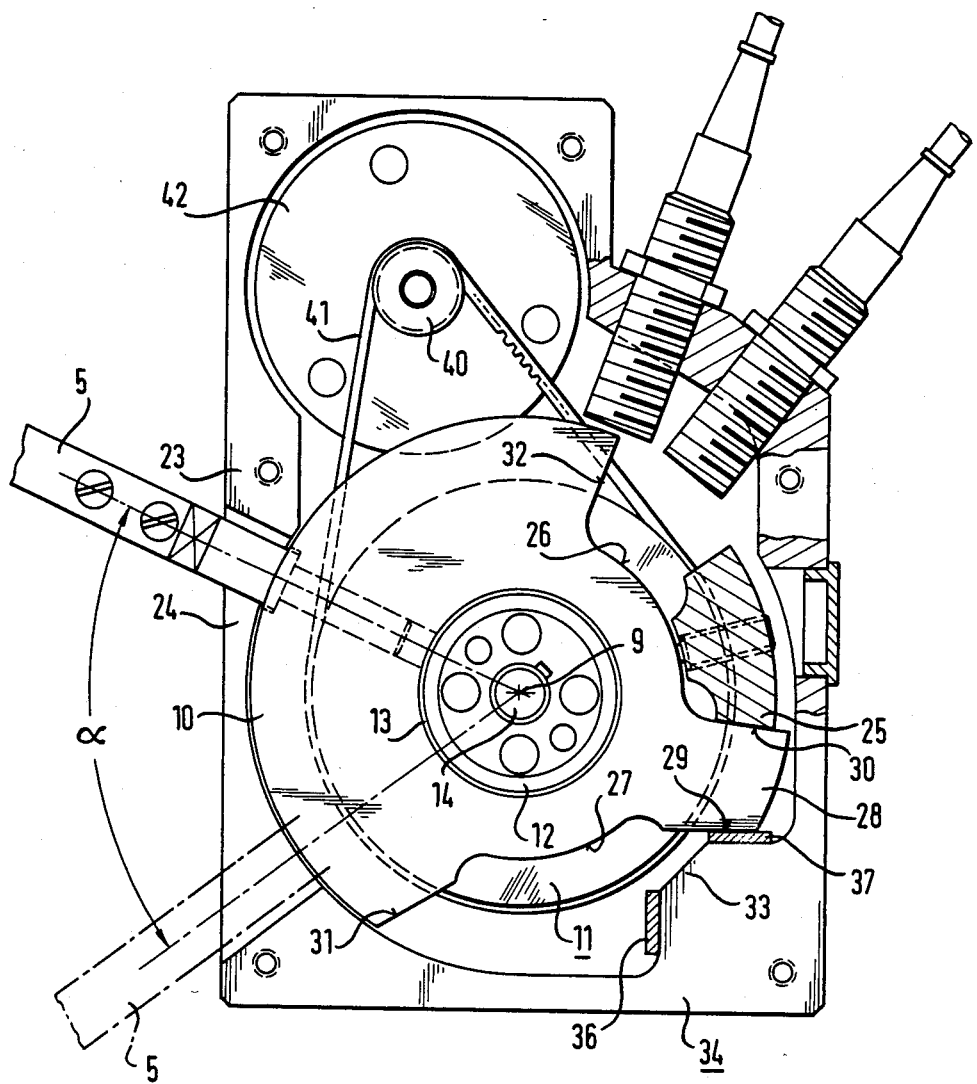
FIG. 3 is a side view of the apparatus according to FIG. 2.

The device for mechanical checking for drill breakage shown in FIGS. 1 to 3 is mounted in the tool transfer region between the body of the machine and a tool magazine immediately beside the area of movement of the tool changer so that its feeler finger 5 protrudes laterally diagonally into the vertical axis of the tool 7 situated in the changing station in the tool magazine—with the usual steep-angle taper—without interfering with the movements of the magazine or the changer. As can be seen from FIG. 1, the device 1 is securely mounted by means of a support 2 on a fixed machine part 3. The feeler rod 5 belonging to the device 1 consists of a hollow profile of, e.g., an aluminium alloy, with its free end arcuately shaped so that the feeler surface is always aligned at right angles to the axis of the tool 7 over the whole range of measurement. A steel spring leaf 8 is glued or otherwise fixed onto the arcuate end of the feeler rod 5. The feeler rod 5 is mounted to pivot about a transverse horizontal axis 9 through an angular sector $\alpha$ which forms the measuring range within which tools 7a, 7b of different lengths can be measured.

As can be seen from FIGS. 2 and 3, the inner end of the feeler rod 5 is fixed radially, e.g. by means of screws, in a carrier disc 10, which is mounted on a stepped profile disc 11. The radially inner hub portion 12 of this profiled disc 17, which has an external bush 13, is seated on a shaft 14 to rotate therewith and is connected by means of set-screws 15 and pins 16 to a toothed pulley wheel 17 which surrounds the shaft 14 with radial play and has its outer end face abutting against a bearing lining 18. The outer (in FIG. 2, lower) part 19 of the profiled disc 11 runs on a second bearing lining 20. The two bearing linings 18, 20 are fixed to the two end walls 21, 22 of a housing 34, in the left-hand side wall 23 of which a cut-out 24 is formed through which the feeler rod 5 extends. On the thin-walled rim of the outer part 19 of the profiled disc 11 is fixed a limit stop 25 for the carrier, which is capable of limited movement within an arcuate cut-out 26 in the carrier disc 10 (cf. FIG. 3). The carrier disc 10 has a further arcuate cut-out 27. The two cut-outs 26, 27 delimit a stop-piece 28 on the carrier disc that has two parallel abutment surfaces 29, 30 of which the upper surface 30 (in FIG. 3) is substantially radial. The other end edges of the two cut-outs 26, 27 in the carrier disc 10 also form abutment surfaces 31, 32. A projection 33 of the housing 34 also projects into the cut-out 27, its two side edges, provided with impact plates 36, 37, forming the fixed end-stop counter-surfaces for the abutment surfaces 29, 30 of the carrier disc. The side edges of the carrier 25 form the counter-surfaces for the abutment surfaces 30, 32 in the cut-out 26.

A toothed belt 41 runs around the toothed pulley-wheel 17 and a pinion 40 and transmits the rotational movement of the shaft 14 via the pinion 40 to a data receiver 42 which is connected to the numerical control device (not shown). The shaft 14 is the output shaft of gears 45 that form a compact drive unit with a direct-current motor 46, of which the torque can be adjusted by means of the current-limiter.

The device just described operates as follows:

Before and after each tool-change operation the DC motor 46 is switched on by the numerical-controller of the machine tool, via the gears 45 and their output shaft 14. This rotates both the profiled disc 11, which is fixed thereto by a key, and the toothed pulley-wheel 17 that is pinned thereto, counterclockwise. The carrier disc 10 carrying the feeler rod 5 is carried along by friction until the feeler rod 5 touches the upwardly-pointing tool tip with its contact coating 8. At this movement the feeler rod 5 and the carrier disc 10 stop. The profiled disc 11 is further rotated by the motor 46 until the side edge of the carrier abutment 25 projecting radially therefrom contacts the abutment surface 32 on the cut-out 26. The motor 46 then ceases to rotate while still exerting the torque set by the predetermined current consumption on the feeler rod 5 via the profile disc 17 and the carrier abutment 25. The feeler rod 5 is thus pressed with a predetermined force against the tip of the upwardly-pointing tool in the tool magazine. In this state the measurement is performed in the measurement recorder of which the pinion 40 is rotated by means of the toothed belt 41 corresponding to the rotational movement of the shaft 14 and the profiled disc 11. After the measuring operation the motor 46 is reversed, thus returning the feeler rod 5 to its uppermost position.

If there is no tool in a given tool holder in the magazine the feeler rod 5 is moved into its lowest position, which is determined by contact of the abutment surface 31 on the cut-out 27 with the contact plate 36 of the abutment 33 fixed to the housing. In the two upper limiting positions of the feeler rod limit switches are operated which switch off the motor 46.

It is an important feature of the operation of the device described above that the feeler tip of a measuring sensor is applied without force to a tool coming from the tool magazine and that the feeler rod is then loaded with an adjustable force of from 10 N to 100 N suited to the diameter of the tool concerned. The measurement determined is stored. When the tool returns from the machine, i.e. after a machining operation, the measuring operation is repeated and its result is compared with that of the first measuring operation. This comparison then shows whether or not the drill has been broken during the machining.

The device described was conceived for drill lengths of from 100 to 300 mm and of a minimum diameter of 1 mm.

Compared with known systems the device described above offers the advantage that the measurement is not affected by dirt and turnings, since turnings and other dirt particles, and liquid droplets, are forced away by the action of the pre-programmed force with which the feeler rod is pressed against the respective tool after it has been brought into contact therewith.

The device shown in FIGS. 4 and 5 is similar in its basic design to the device according to FIGS. 1 to 3 described above. For this reason both constructionally and functionally similar parts are given the same numbers. Instead of the measurement being detected by cooperation of the carrier disc 10 that carries the feeler rod with the profiled disc 11, in this embodiment according to FIGS. 4 and 5 the measurement is detected by a shaft encoder 50 mounted with its axis parallel to the driving motor 46 in the housing 34. The pinion 40 of the shaft encoder 50 is connected via the toothed belt 41 with the toothed wheel 17 that is fixed to a bush 51. The longitudinally slit end 54 of the feeler rod 5 is clamped by means of a screw 54 on to the front end of the end piece 52 of the bush 51 that projects from the cover 53 of the housing 34. The bush 51 is also mounted in two bearings 55, 56 in the housing cover 53 or in an intermediate wall 57, and is connected to rotate with a deformable plug-like intermediate member 58 by means of a transverse peg 59. Into this plug-shaped intermediate member 58 there projects the end of the shaft 14 of the driving motor 46, which can also be a stepping motor. The rotationally fixed connection between the end of the shaft and the intermediate member 58 arranged coaxially with the bush 51 and the shaft 14 is effected by a second transverse peg 60 that is pressed into mutually connected bores in the hollow end part of the intermediate member 58 and in the end 14 of the shaft.

The device according to FIGS. 4 and 5 operates as follows:

Before and after each tool-change operation the motor 46 of the numerical controller 62 of the machine tool is switched on and activated via the electrical connections 63, 64. The corresponding rotation of its output shaft 14 is transmitted to the rotationally mounted bush 51 via the intermediate member 58, which acts as a shock-absorbing flexible coupling. Through the rotation of the bush 51 the feeler rod 5 performs a pivotal movement in the direction of the arrow in FIG. 4. At the same time the toothed pulley wheel 17 fixed to the bush 51 rotates and drives the pinion 40, fixed to the shaft 39 of the shaft encoder 50, via the toothed belt 41. The rotation of the shaft 39 is converted, for example by electromagnetic detection in known manner, into a corresponding number of impulses that are fed to the numerical controller 62 of the machine tool via the electrical measurement leads 65, 66. The movements of the individual parts are terminated by the contact of the feeler rod 5 with the tool tip, whereby a certain over-run of the motor 46 occurs within the limits set by the flexible coupling, and the feeler rod 5 exerts a certain predetermined pressure on the tool tip in order to eliminate the influence of particles lying thereon, such as turnings or the like. However, the solid bush 51 and the toothed pulley wheel 17 do not share in the over-run movement, but remain stationary on contact of the feeler rod 5 with the tool. Simultaneously the pinion 40 and the shaft 39 of the shaft encoder also come to a standstill. The number of electrical impulses produced during the rotation of the shaft encoder 50 is for example detected in the numerical controller as the measure of the extent of the pivotal movement of the feeler rod 5.

The man skilled in the art will appreciate that the devices according to the invention, particularly the device according to FIGS. 4 and 5, can be used not only for checking for tool breakages but also for the measurement of their length, for example in order to detect the state of wear of a tool at each tool change and/or to perform zero-point corrections by the numerical controller.

The device according to FIGS. 4 and 5 is of simpler construction and avoids impact stress of the curved contact section of the feeler rod 5 because of the flexible coupling between the motor shaft 14 and the bush 51. The range of movements of the feeler rod 5 is about 60 to 350 mm.

The invention is not limited to the device described. Thus the parts fixed to the feeler rod can for example also be connected to the motor shaft via other friction couplings which allow a first light application of the feeler rod to the tool tip and subsequent pressure of adjustable magnitude. Moreover it is in principle possible, particularly for smaller measuring ranges, to fix the feeler rod to a holder that can be displaced parallel to the tool axis and to move this holder by a linear drive, e.g. a pneumatic or hydraulic cylinder, a ratchet drive or even an electric motor, until the feeler rod situated on the longitudinal axis of the tool touches the tool tip. The measurement of the amount of travel of the holder can then be performed, e.g., inductively by means of moving coils.

What is claimed is:

1. In a device for tool checking in machine tools, such device having a sensor assembly for sensing a surface of a tool having a tool rotation axis, and also having an electronic evaluation device operative on signals from the sensor assembly for determining a measurement or location sensed by the sensor assembly, the improvement wherein the sensor assembly includes
    a movable feeler rod having a contoured tool contact surface for contacting the end of a tool, said surface having a contour adapted to remain perpendicular to the tool axis during motion of the feeler rod,
    drive means coupled to the feeler rod for urging the contact surface against the tip of the tool,
    means for controlling driving power provided to the feeler rod by said drive means so that the contact surface contacts the tool with an adjustable force independent of the length of the tool, and
    position indicating means coupled to the drive means for developing an indication of the position of the feeler rod and thereby of the tip of a tool, whereby tool wear and breakage are detected and measured by the evaluation device.

2. A device according to claim 1, wherein the sensor assembly further includes swing mounting means for pivotally mounting the feeler rod about an axis transverse to the tool axis; and wherein said drive means drives the feeler rod about the mounting means.

3. A device according to claim 1 or claim 2, wherein the feeler rod is fixed radially in a rotating body that is frictionally coupled via a carrier to a coaxial profiled disc which is driven through gearing by a driving motor, so as to allow limited movement.

4. A device according to claim 3, wherein the rotating body is a disc-shaped body formed with two cut-outs defining a cross-piece, whereby the carrier coupled to the profiled disc engages in one cut-out with lost motion and an abutment fixed to the housing engages in the other cut-out of the disc-shaped rotating body.

5. A device according to claim 3, characterized in that the gearing is rotationally fixed to the profiled disc and to a toothed pulley wheel that drives the pinion of an evaluation device via a toothed belt.

6. A device according to claim 1, wherein the feeler rod aligned transverse to the tool axis is displaceable in the direction of the tool axis and is coupled to a linear drive.

7. A device according to claim 1, wherein the feeler rod is connected by a flexible coupling to the shaft of an electric driving motor and by a transmission to a shaft encoder.

8. A device according to claim 7, wherein the flexible coupling includes a plug-like flexible intermediate member that is fixed on one side to the free end of the shaft and on the other side to a bushing on which is fixed a toothed pulley wheel that drives the shaft of the shaft encoder through a toothed belt and a pinion.

9. A device according to claim 8, wherein the feeler rod is fixed on an end of the bushing.

10. A device according to claim 7, wherein the electric motor and the shaft encoder are arranged with their axes parallel in a common housing and are electrically connected to the numerical controller unit.

* * * * *